United States Patent
Sambamurthy et al.

(10) Patent No.: US 8,627,150 B2
(45) Date of Patent: Jan. 7, 2014

(54) SYSTEM AND METHOD FOR USING DEPENDENCY IN A DYNAMIC MODEL TO RELATE PERFORMANCE PROBLEMS IN A COMPLEX MIDDLEWARE ENVIRONMENT

(75) Inventors: Govinda Raj Sambamurthy, Bangalore (IN); Raji Sankar, Bangalore (IN); Rahul Goyal, Bangalore (IN); Ashwin Kumar Karkala, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 511 days.

(21) Appl. No.: 13/009,788

(22) Filed: Jan. 19, 2011

(65) Prior Publication Data

US 2012/0185736 A1     Jul. 19, 2012

(51) Int. Cl.
*G06F 11/00* (2006.01)

(52) U.S. Cl.
USPC ........................................................ 714/47.3

(58) Field of Classification Search
None
See application file for complete search history.

(56) References Cited

U.S. PATENT DOCUMENTS

| | | | |
|---|---|---|---|
| 5,222,065 A | 6/1993 | Krogmann | |
| 5,257,358 A | 10/1993 | Cohen | |
| 5,958,009 A | 9/1999 | Friedrich et al. | |
| 6,018,300 A | 1/2000 | Dowden et al. | |
| 6,049,666 A | 4/2000 | Bennett et al. | |
| 6,549,521 B1 * | 4/2003 | Edwards et al. | 370/255 |
| 6,792,460 B2 | 9/2004 | Oulu et al. | |
| 6,954,779 B2 | 10/2005 | Duggan et al. | |
| 7,020,802 B2 | 3/2006 | Gross et al. | |
| 7,237,023 B2 | 6/2007 | Menard et al. | |
| 7,424,530 B2 * | 9/2008 | Chagoly et al. | 709/224 |
| 8,205,116 B2 | 6/2012 | Yang et al. | |
| 8,219,997 B2 | 7/2012 | Shimizu et al. | |
| 2001/0034663 A1 | 10/2001 | Teveler et al. | |
| 2005/0172306 A1 | 8/2005 | Agarwal et al. | |
| 2005/0216781 A1 | 9/2005 | Doshi et al. | |
| 2008/0288827 A1 * | 11/2008 | Chagoly et al. | 714/47 |
| 2010/0169713 A1 * | 7/2010 | Argue et al. | 714/25 |
| 2011/0145651 A1 | 6/2011 | Molnar et al. | |
| 2012/0216205 A1 | 8/2012 | Bell et al. | |
| 2012/0284719 A1 | 11/2012 | Phan et al. | |
| 2012/0304182 A1 | 11/2012 | Cho et al. | |

* cited by examiner

*Primary Examiner* — Michael Maskulinski
(74) *Attorney, Agent, or Firm* — Fliesler Meyer LLP (57) ABSTRACT

A method of isolating relevant components associated with a performance problem. The method comprises creating a static model of a system under test, including determining relationships between components in a middleware system. The method also comprises creating a dynamic problem tree by applying the static model to the system at runtime. The method further comprises identifying a link probability for each relationship in the dynamic problem tree; and traversing the dynamic problem tree to detect redundant components. A component is redundant if it has a link probability with its downstream component greater than a pre-determined threshold value. The method also comprises removing redundant components from the dynamic problem tree; and returning a set of components which are potential components to be analyzed further to determine the root causes of the performance problem.

18 Claims, 8 Drawing Sheets

SYSTEM AND METHOD FOR USING DEPENDENCY IN A DYNAMIC MODEL TO RELATE PERFORMANCE PROBLEMS IN A COMPLEX MIDDLEWARE ENVIRONMENT

CROSS REFERENCE TO RELATED APPLICATIONS

This application is related to the following U.S. Patent Applications, each of which is incorporated by reference herein in its entirety:

U.S. patent application Ser. No. 13/009,775 entitled "SYSTEM AND METHOD FOR DETERMINING CAUSES OF PERFORMANCE PROBLEMS WITHIN MIDDLEWARE SYSTEMS", by Govinda Raj Sambamurthy et al., filed on Jan. 19, 2011;

U.S. patent application Ser. No. 13/009,777 entitled "METHOD OF MEASURING AND DIAGNOSING MISBEHAVIORS OF SOFTWARE COMPONENTS AND RESOURCES", by Raji Sankar et al., filed on Jan. 19, 2011;

U.S. patent application Ser. No. 13/009,781 entitled "EFFICIENT DATA COLLECTION MECHANISM IN A MIDDLEWARE RUNTIME ENVIRONMENT", by Raji Sankar et al., filed on Jan. 19, 2011; and U.S. patent application Ser. No. 13/009,800 entitled "SYSTEM AND METHOD FOR PROVIDING A STATIC MODEL MAP OF BEHAVIORS IN A MIDDLEWARE SYSTEM, FOR USE IN IDENTIFYING SYSTEM PROBLEMS" by Raji Sankar et al., filed on Jan. 19, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to diagnosing performance problems in middleware systems, and particularly to a system and method for using dependency in a dynamic model to relate performance problems in a complex middleware environment.

BACKGROUND

Inferring the relationships between the runtime components in a middleware system is not always straightforward. In a typical server administration scenario, this can include manual analysis of the behavior of runtime performance of various components. Such manual analysis can result in multiple iterations to determine the root cause of a performance problem. This can entail loss of crucial time in a production environment in fixing the performance problems. These iterations can also result in false positives as root causes, which may not be the actual component causing degradation in performance in the system. At present there is no standard way of determining whether the performance symptoms visible within a component in a middleware system are due to a problem within that component or whether they are merely an effect of a dependent component. These are areas that embodiments of the invention are intended to address.

SUMMARY

A method of isolating relevant components associated with a performance problem is provided. The method comprises creating a static model of a system under test, including determining relationships between components in a middleware system. The method also comprises creating a dynamic problem tree by applying the static model to the system at runtime. The method further comprises identifying a link probability for each relationship in the dynamic problem tree; and traversing the dynamic problem tree to detect redundant components. An upstream component is considered redundant if it has a link probability with its downstream component greater than a pre-determined threshold value. The method also comprises removing redundant components from the dynamic problem tree; and returning a set of components which are potential components to be analyzed further to determine the root causes of the performance problem.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, the methods and techniques for measuring and diagnosing software misbehavior can be implemented in a software middleware system, such as an application server. Other types of middleware systems can also be utilized in conjunction with the various embodiments described herein, such as web servers, business process management (BPM) and process execution systems, enterprise service buses, service access gateways, messaging brokers and messaging systems, and the like.

Definitions

In accordance with an embodiment, as used herein, the term "downstream" is used to refer to a component that is invoked by another component and comes later in the call trace.

In accordance with an embodiment, as used herein, the term "upstream" is used to refer to a component that invokes another component. The upstream component comes before the downstream component in the call trace. For example, when an EJB invokes a JDBC Data Source, the EJB is termed as the upstream component and the JDBC Data Source is termed as the downstream component.

In accordance with an embodiment, as used herein, the term "efficiency" is used to refer to a computation with no units, and normalized against load. It is defined as the ratio of the number of requests in this sampling period that completed execution within the sampling period to the total number of requests that came in for processing in this sampling period. Though it is normalized against load, it will vary with load if load affected the behavior of the component and stay constant if not.

In accordance with an embodiment, as used herein, the term "inefficiency" is used to refer to the inverse of efficiency. It is defined as the ratio of the number of requests in this sampling period that is still executing at the end of this sampling period to the total number of requests that came in for processing in this sampling period.

In accordance with an embodiment, as used herein, the terms "performance indicator," "performance metric" and/or "performance indicator/metric" are used interchangeably to refer to any metric characterizing the response time, throughput or load on hardware or software components in a system.

In accordance with an embodiment, as used herein, the term "bottleneck" is used to refer to any situation in which performance of a system is diminished or otherwise compromised due to the poor performance of one or more components. The component or components causing the bottleneck are referred to herein as "bottleneck components."

In accordance with an embodiment, as used herein, the term "model" is used to refer to a hierarchical representation of the relations between components within middleware systems. A model can include a static hierarchy of component types, which is predefined or predetermined during the design phase, and dynamic relations, which are established between component instances during runtime.

In accordance with an embodiment, as used herein, the term "problem tree" is used to refer to a runtime instance of a model, represented as a tree of related components that exhibit performance problems at runtime. The components in a problem tree may or may not be "effects" of one another.

In accordance with an embodiment, as used herein, the term "link probability" is used to refer to a measure of co-occurrence of performance problems within components, which are known to be related to each other, by virtue of their links in a problem tree.

In accordance with an embodiment, a method of isolating relevant components associated with a performance problem is provided. The method comprises creating a static model of a system under test, including determining relationships between components in a middleware system. The method also comprises creating a dynamic problem tree by applying the static model to the system at runtime. The method further comprises identifying a link probability for each relationship in the dynamic problem tree; and traversing the dynamic problem tree to detect redundant components. An upstream component is considered redundant if it has a link probability with its downstream component greater than a threshold value. The method also comprises removing redundant components from the dynamic problem tree; and returning a set of components to be analyzed further to determine the potential root causes of the performance problem.

In accordance with an embodiment, the relationships between the various components in a middleware topology, as deployed in a real-world environment, can be complex. Performance degradation that is visible in one component may be due to the poor performance of another component. For example, in an application, both the business tier as well as the data access layer could exhibit symptoms of performance problems. However, the identification of the actual component, which is the root cause of a performance problem, is a key to resolving that performance problem. Diagnosing the system to identify that actual component can be complex in a middleware topology. In accordance with an embodiment, this inherent complexity can be due to the distributed nature of services in a given middleware topology.

In accordance with an embodiment, the runtime components in the middleware stack can include coarse grained components, such as different member servers within a server cluster, or fine grained components within a single server, such as servlet containers, EJB containers, JDBC DataSource containers, and other containers and/or other runtime environments. Components can be dependent on one another directly, where one component invokes another component at runtime, or indirectly, where several components share common resources. For example, an EJB pool might display inferior performance if a JDBC DataSource in the downstream execution path requires more execution time. In this case, the EJB pool and the JDBC DataSource are directly dependent on one another. Additionally, multiple components may impact performance of one another, as they could all be part of a distributed transaction. For example, an MDB execution may take longer time to complete and commit if there exists a long running SQL within the same JTA Transaction. Similarly, when multiple components share common resources, such as the JVM Heap, the server thread pool, or other runtime resources, the performance problems of one component can indirectly affect another component through the shared resource. The runtime dependency could also be due to a skewed load distribution within a cluster. For instance, if within a cluster, one of the servers becomes hung, the other servers may experience a rise in load, which can lead to a bottleneck within the system.

Figure 1:
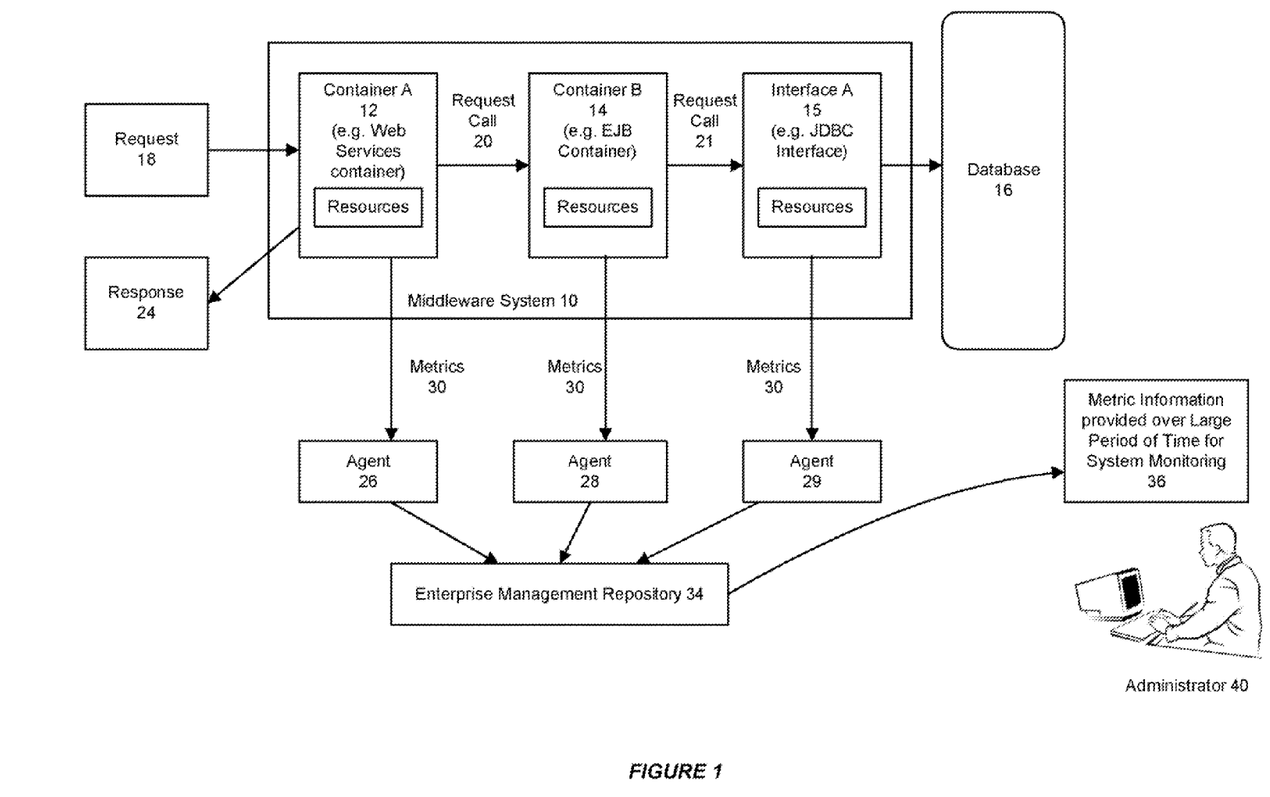
FIG. 1 illustrates a system, such as a middleware system, in accordance with an embodiment.

FIG. 1 illustrates a system, such as a middleware system, in accordance with an embodiment. As shown in FIG. 1, a typical middleware system 10 includes a plurality of resources, which in turn can be provided within containers 12, 14, such as Web Services or EJB containers, or as interfaces 15, such as a JDBC interface. A typical middleware system can also include a database 16, or provide access to one or more external databases. When a request 18 is received at the system, these resources are successively called or otherwise used 20, 21, to allow the system to eventually respond 24 to the request. Typically, individual resource usage information can be collected from the containers and interfaces by a plurality of agents 26, 28, 29 that are associated with the various containers and interfaces. The resource usage information or metrics 30 can be stored or otherwise provided to an enterprise manager repository 34. The information in the enterprise manager repository thus reflects an overview of metric information for the system over a relatively large period of time 36, and as such is useful for system monitoring by a system administrator 40. However, this form of metric information is of less use in identifying system problems when they occur.

Figure 2:
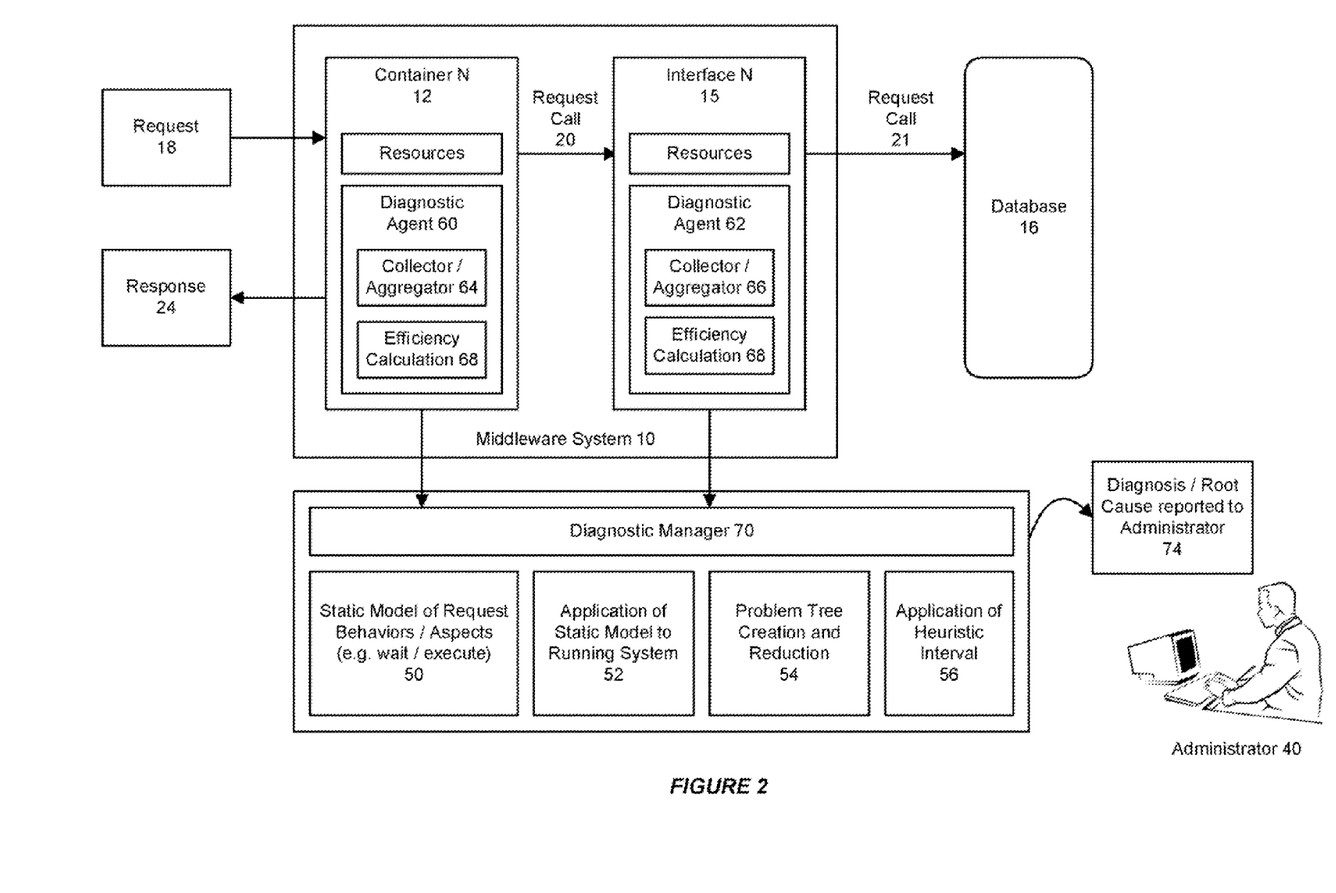
FIG. 2 illustrates a more detailed view of a system, such as a middleware system, that can be analyzed in accordance with an embodiment.

FIG. 2 illustrates a more detailed view of a system, such as a middleware system, in accordance with an embodiment. As shown in FIG. 2, the middleware system again includes a plurality of resources provided, e.g. as containers or interfaces, and again includes or provides access to one or more databases. In accordance with an embodiment, the system can allow definition of one or more of a static model of request behaviors 50, and allow application of the static model 52, to define behaviors within the current system configuration that are of most interest in problem identification (such as potential resource bottlenecks, or patterns of resource behavior that indicate potential problems). In accordance with an embodiment, a plurality of diagnostic agents 60, 62, coupled with collector/aggregators 64, 66, and a diagnostic manager 70, can provide information describing the runtime "efficiency" of a particular resource, within the context of this system. This information can then be used in combination with a problem tree 54, and heuristic interval 56, to provide diagnosis or the "root cause" 74 of a particular current system problem to the system administrator.

Figure 3:
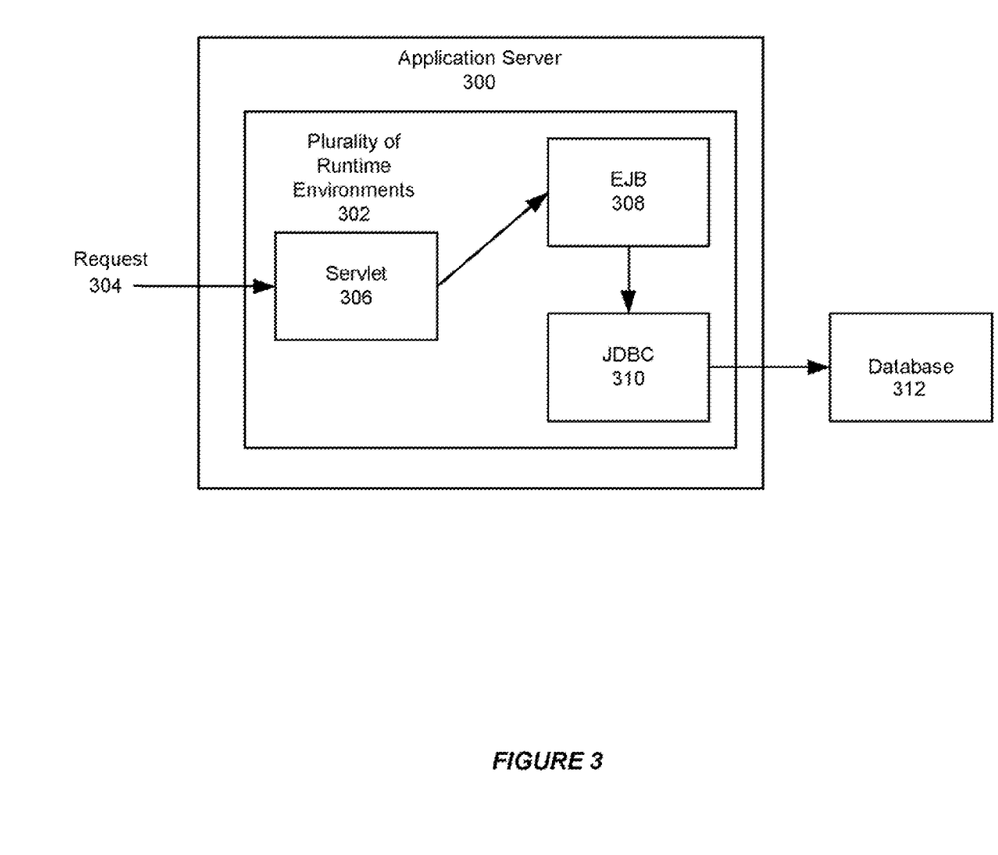
FIG. 3 shows an application server, in accordance with an embodiment.

FIG. 3 shows an application server, in accordance with an embodiment. FIG. 3 shows a particular example of a middleware system, such as those described in FIGS. 1 and 2, above. In accordance with an embodiment, an application server 300 can include a variety of runtime environments 302. These runtime environments can include EJB containers, servlet containers, Messaging Services, Web Service containers, Data source pools, Thread pools, and other runtime environments. Each runtime environment provides services such as transactions, security, and concurrency, for the application components deployed to the application server. Each of these runtime environments can have a number of configuration parameters that affect their performance. The performance of the middleware stack depends on the performance of each of these underlying containers. For example, as shown in FIG. 3, a request 304 can be received by a servlet container 306 which then invokes EJB container 308, which then invokes JDBC container 310 which accesses database 312. When a performance problem is encountered while serving the request, it may not be immediately clear which component is at fault. As such, diagnosing the root-cause when a performance problem occurs in such a complex environment therefore can be challenging.

Traditionally, there was no standard way of determining whether the performance symptoms visible within a component in a middleware system was due to a problem within that component or whether they are merely an effect of a dependent component. Embodiments of the present invention are based on the idea of applying a quasi-static dependency model of components onto a real world production environment to identify components that display performance symptoms due to an impact of a related component. Detection of such components, which are effects of the real problem component, can help a system administrator in eliminating redundant performance problems while diagnosing a complex topology, as opposed to deriving runtime relationship between components.

As described above, deriving runtime relationships between components directly to fix problems can be complex. Embodiments of the present invention achieve elimination of redundant performance symptoms by applying a quasi-static performance model onto a middleware topology and inspecting the link probability to identify if a known problem is an effect of another problem in a related component. This offers a more reliable alternative to the manual process of analyzing each and every component exhibiting performance issues.

Figure 4:
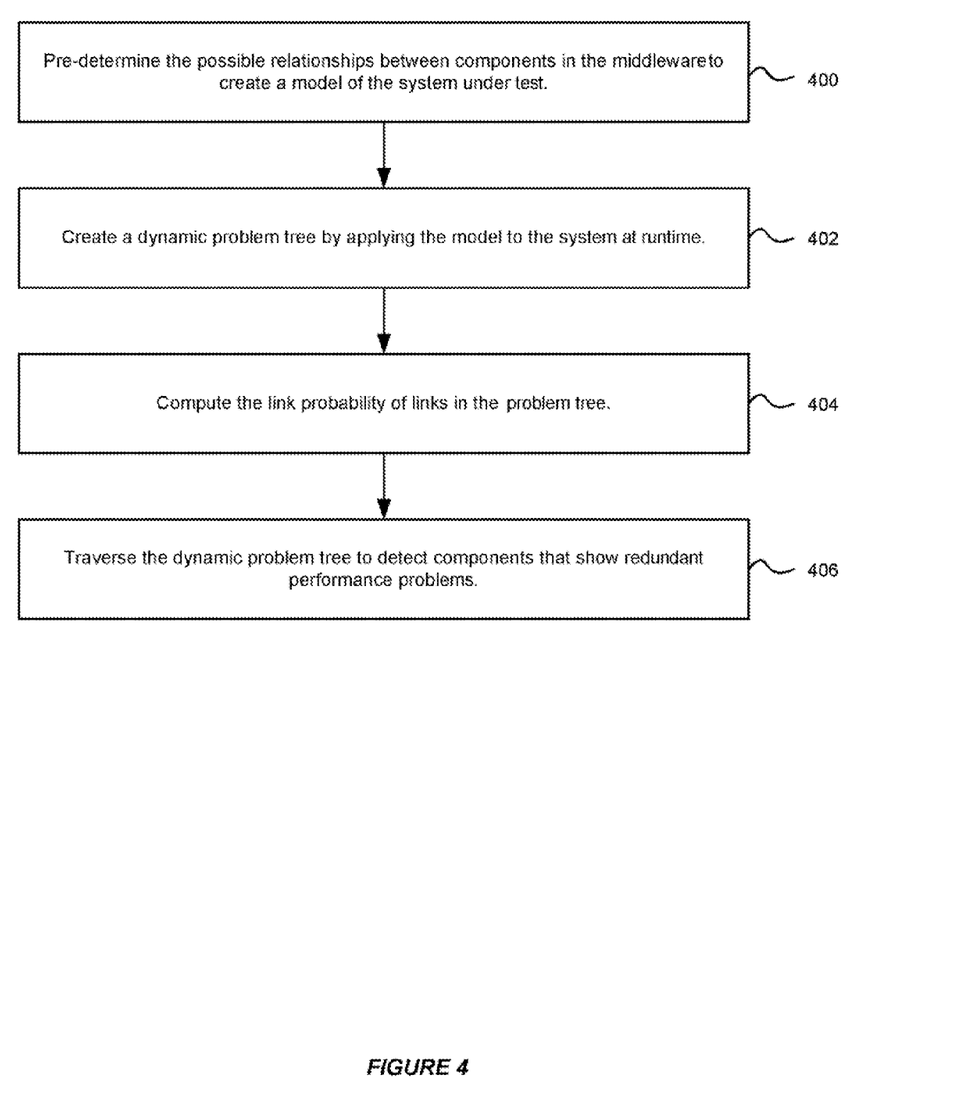
FIG. 4 shows a method of isolating relevant components associated with a performance problem, in accordance with an embodiment.

FIG. 4 shows a method of isolating relevant components associated with a performance problem, in accordance with an embodiment. At step 400, the possible relationships between components are pre-determined to create a model of the system under diagnosis. At step 402, a dynamic problem tree is created by applying the above model at runtime. At step 404, the link probabilities of all links, which is a measure of co-occurrence of problem components, in the problem tree are computed. At step 406, the dynamic problem tree is traversed to detect the redundant problem components.

Embodiments of the present invention address the problem of eliminating redundant performance issues within a middleware system. In accordance with an embodiment, this follows a three pronged approach: Model Definition; Problem-Tree Creation; and Tree Normalization. Each will be discussed in more detail in turn.

Model Definition

As described above, and in accordance with an embodiment, the model is a tree representation of the different relations that can exist between different components in a middleware system which can be diagnosed. A model structure definition represents each diagnosable object such as server or a component. Models can have a static tree defined during design time and dynamic nodes to which relations are established during runtime. The static hierarchy of the model can remain static for every instance of the system type under observation e.g., Cluster, Server, etc; whereas the dynamic hierarchy can vary with each instance of the system under observation.

Figure 5:
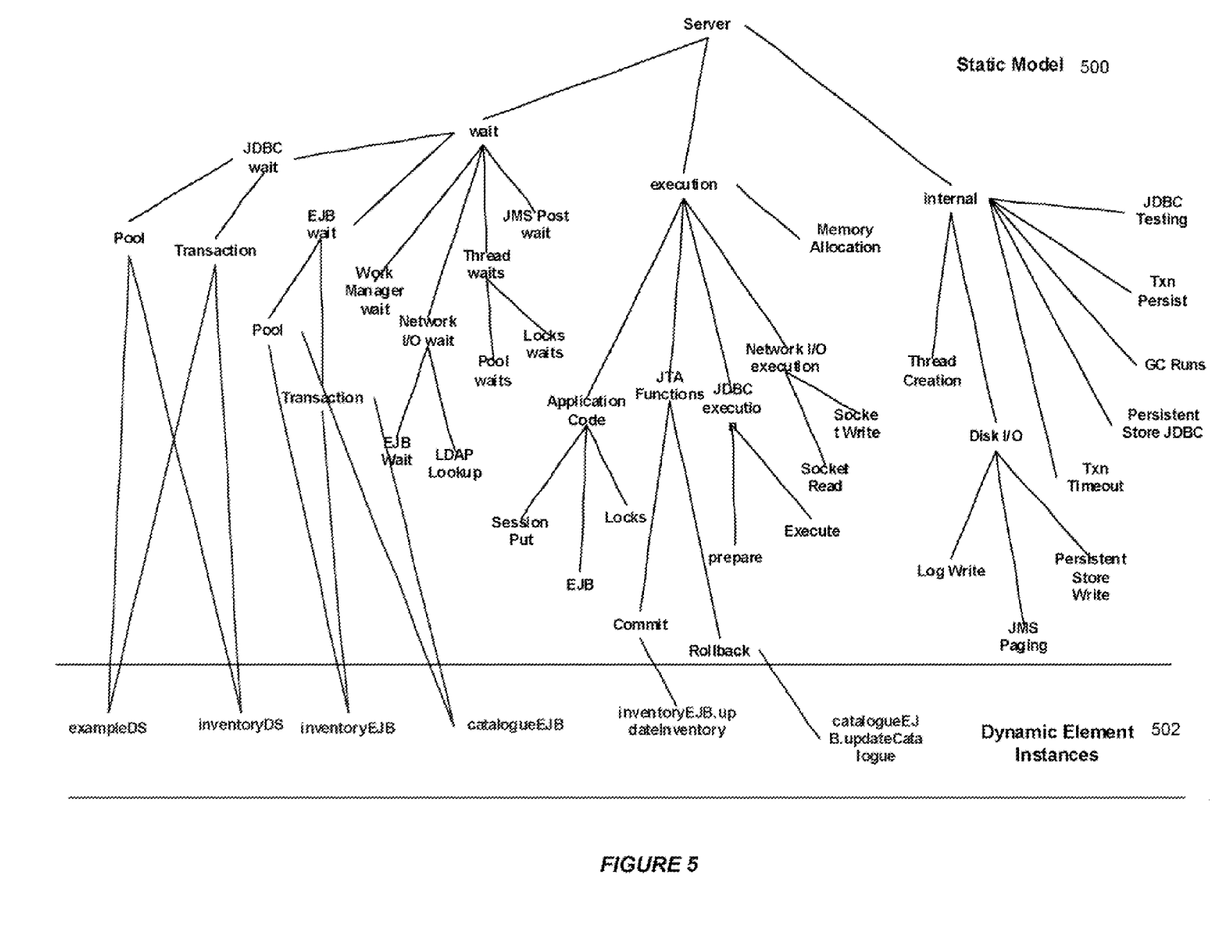
FIG. 5 shows a sample illustration of a model for a server, in accordance with an embodiment.

FIG. 5 shows a sample illustration of a model for a server, in accordance with an embodiment. The static structure 500 of the model can be pre-defined based on possible relationships known at design time. For example, it can be established that an EJB may call a JDBC Data Source. Hence they are related within a model structure. Dependencies of components can either be intra-element or inter-elements. For instance, the slow execution of an SQL in JDBC Data Source by itself may trigger a bottleneck and cause high wait times in the JDBC Data Source. Such intra-element links are statically recognized at design time. This static relation is established implicitly in the dependency tree. The dynamic representation 502 of the model involves detection of which EJB is related to which JDBC Data Source. This requires knowledge of which instance is related to another and hence will be done only at runtime.

Problem Tree Creation

In accordance with an embodiment, during this phase, each of the components within a model is inspected for problem symptoms such as response time delays, bottlenecks or unusual memory utilization. A common unit of measure called efficiency of a component can be derived based on the performance metrics of the different aspects mentioned above. By evaluating and comparing the efficiencies of various components, the problem components within an application server can be identified.

In accordance with an embodiment, once the components having problems are identified, links between the problem components are identified. A link is associated between two problem components, if there is a relationship defined between their corresponding component types in the model. The links can be identified by applying the pre-determined relationships in the model onto various instances within a runtime environment. Various data points, such as configuration data, e.g., deployment descriptors, server configuration, thread stack data, JTA Transaction data, JNDI calls, and RMI calls, can be leveraged to arrive at the instances of links at runtime. While discovering the links, only the relationships between problem components are considered. Relationships between problem components and non-problem components are ignored. The derivation of such links can include the detection of dynamic relationship between components in the model at runtime. In short, the discovery of such links at runtime results in creation of problem trees which capture the problem components and their runtime relationships between instances as defined in the static model.

Along with the discovery of the links at runtime while creating the tree, link probability can also be computed. As described above, link probability is a measure of co-occurrence of two related problem components. In accordance with an embodiment, the link probability between two components is computed as a ratio of the load passing through both the problem components to that of the overall load through the model. This ratio is shown as an equation below:

$$LinkProbability = \frac{LoadThroughTwoProblemComponents}{OverallLoadInTheModel}$$

Tree Normalization

In accordance with an embodiment, once the problem tree is created for each model, the problem tree can then be normalized to isolate the relevant components. Each problem component is inspected to see if it is the result of an effect of some downstream problem component. The farthest downstream problem component will always be considered for causal analysis, as it does not have any further downstream components causing any effects. For any other problem component that lies in a different level in the tree, the link probability is inspected.

In accordance with an embodiment, if the link probability is greater than 50% or 0.5, it can be established that most of the load in the model is passing through both of the problem components and that the performance degradation seen in the upstream component is an effect of the poor performance of the downstream component. Hence, if the link probability is greater than 50%, the problem component that appears as the upstream component is discounted as redundant. This tree traversal is continued over multiple iterations until all redundant problem components are eliminated. Although a link probability of 0.5 is used in this example, any link probability can be used depending on application and user preferences. In accordance with an embodiment, the link probability used to determine whether a problem component is redundant can be determined dynamically as a function of other performance metrics and system information.

In accordance with an embodiment, through this process of problem tree traversal and tree normalization, the problem components that are effects of any level of downstream problem components are identified and removed from the causal diagnostics. This reduces the number of components and narrows down scope of deep diagnostics to be undertaken by the administrator to a limited set of components. By achieving this, there can be faster turnaround in diagnostics and reduction in the number of false positives.

Sample Illustration

Figure 6:
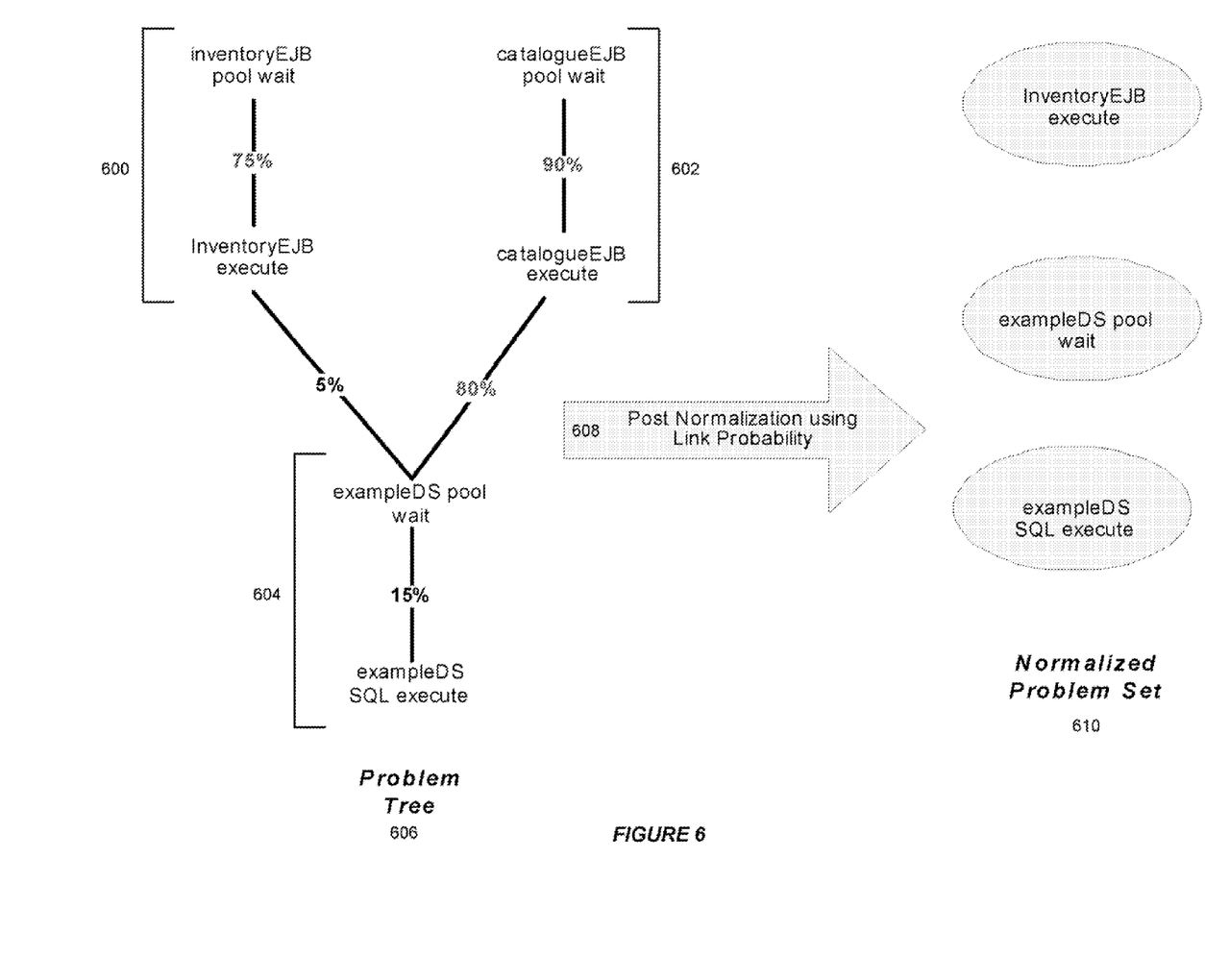
FIG. 6 shows an example problem tree and normalization, in accordance with an embodiment.

FIG. 6 shows an example problem tree and its normalization, in accordance with an embodiment. The following example illustrates a server that exhibits problem symptoms in different components such as the execution of SQL statements, getting SQL connections from JDBC Data Source, EJB Pool wait and EJB execution. Here there are two EJBs the InventoryEJB 600 as well as the CatalogueEJB 602 that invoke SQL statements through the JDBC Data Source exampleDS 604. From the static model (such as that shown in FIG. 5), it is evident that a JDBC DataSource and an EJB instance could be related. Using both deployment descriptors and runtime data, the relationships between the EJBs and the DataSource can be established and the link probability ratios can be computed. The resultant problem tree 606 is depicted in the left side.

The Tree Normalization 608 step will then traverse the problem components in the problem tree and eliminate redundant problem components, wherever the link probability is higher than a threshold value, e.g., 50%. The resultant normalized problem set 610 having a lesser number of components to be further analyzed or fixed, is portrayed on the right side. Having so reduced the number of possible components that are the cause of the performance problem, the additional analysis required to determine the root cause is greatly reduced.

Figure 7:
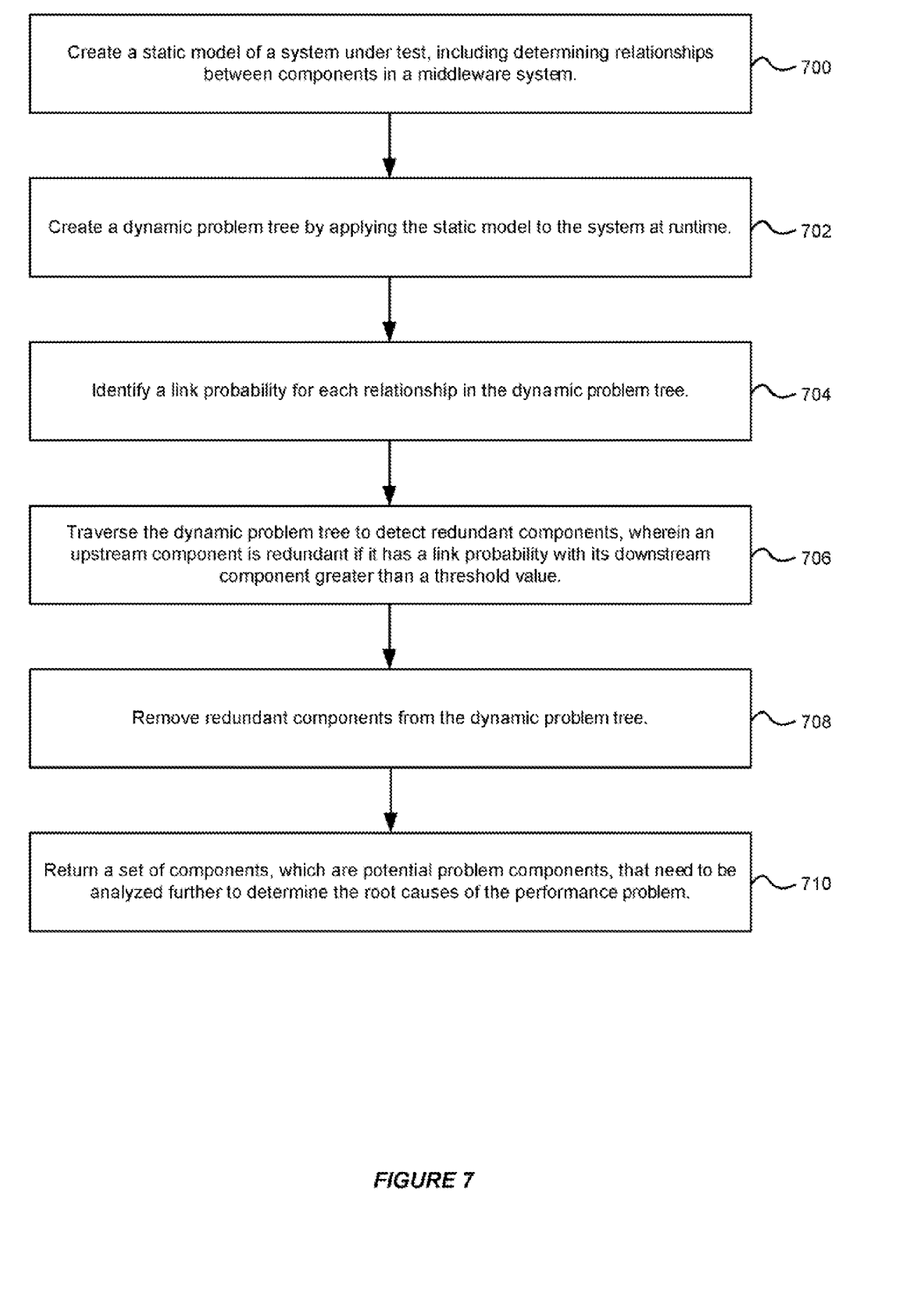
FIG. 7 shows a method of isolating relevant components associated with a performance problem, in accordance with an embodiment.

FIG. 7 shows a method of determining a root cause of a performance problem, in accordance with an embodiment. At step 700, a static model of a system under test is created. This can include determining relationships between components in a middleware system. At step 702, a dynamic problem tree is created by applying the static model to the system at runtime. The dynamic problem tree shows the relationships between instances of components which have been identified as being potential problem components. At step 704, a link probability is identified for each relationship in the dynamic problem tree. At step 706, the dynamic problem tree is traversed to detect redundant components. A component is redundant if it has a link probability with its downstream component greater than a threshold value, for example 0.5. At step 708 redundant components are removed from the dynamic problem tree. At step 710, a set of components which are potential causes of the performance problem are returned for further analysis.

Figure 8:
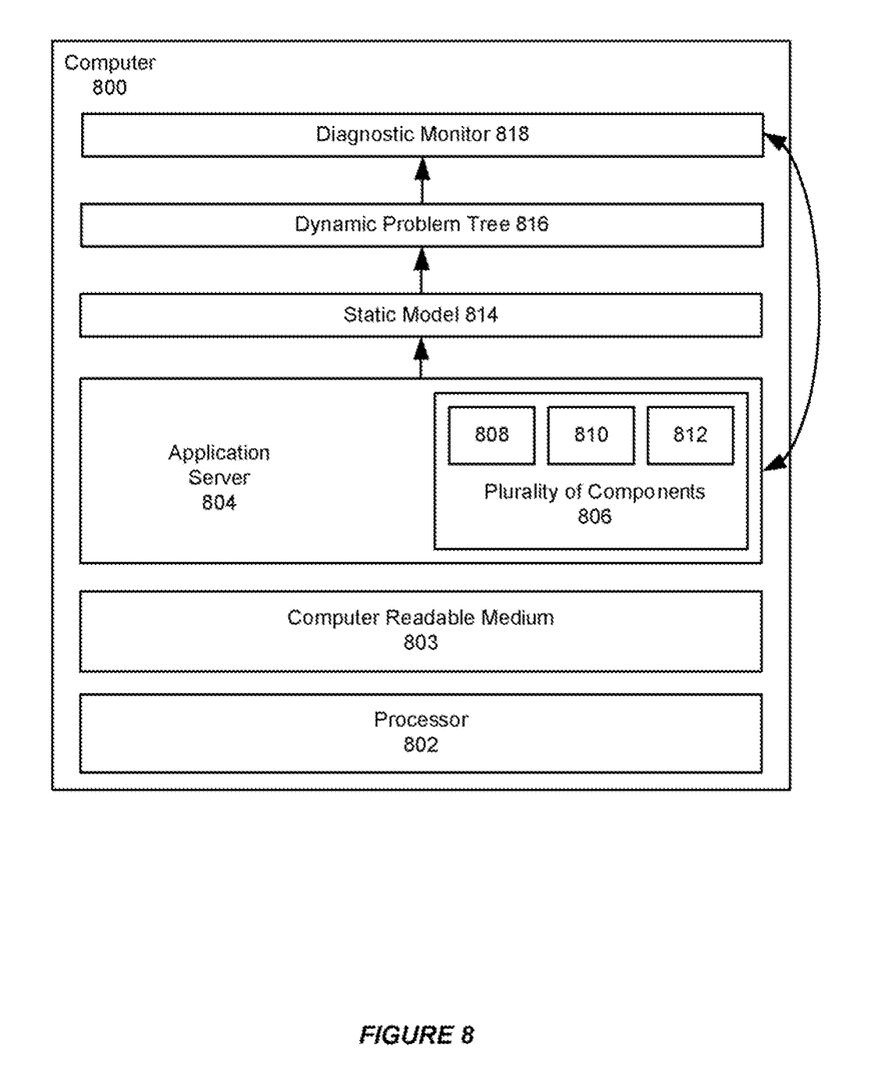
FIG. 8 shows a system for isolating relevant components associated with a performance problem, in accordance with an embodiment.

FIG. 8 shows a system for determining a root cause of a performance problem, in accordance with an embodiment. The system comprises a computer 800, which includes a computer readable medium 803 and processor 802 operating thereon. An application server 804 executing on the computer, includes a plurality of components 806 (e.g. components 808-812). A static model 814 of the system under test, includes relationships between the plurality of components. For example, where it is known that one component can call a second component, those two components are linked in the static model at design time. A dynamic problem tree 816 can be created by applying the static model to the system at runtime. The dynamic problem tree shows relationships between instances of identified problem components at runtime. When one or more problem symptoms are detected, diagnostic monitor 818 can identify a link probability for each relationship in the dynamic problem tree, traverse the dynamic problem tree to detect redundant components, wherein a component is redundant if it has a link probability with its downstream component greater than a pre-determined threshold value, remove redundant components from the dynamic problem tree, and return a set of components which are potential causes of the performance problem.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method of isolating relevant components associated with a performance problem, comprising:
    creating a static model of a system under test, including determining relationships between components in a middleware system;
    creating a dynamic problem tree by applying the static model to the system at runtime;
    identifying a link probability for each relationship in the dynamic problem tree;
    traversing the dynamic problem tree to detect redundant components, wherein a component is redundant if it has a link probability with its downstream component greater than a pre-determined threshold value;
    removing redundant components from the dynamic problem tree;
    returning a set of isolated components which are relevant in the context of the performance problem.

2. The method of isolating relevant components associated with a performance problem of claim 1, wherein the threshold value is 0.5.

3. The method of isolating relevant components associated with a performance problem of claim 1, wherein the static model is created at design time.

4. The method of isolating relevant components associated with a performance problem of claim 1, wherein the dynamic problem tree is created at runtime by determining which instances of the components are related.

5. The method of isolating relevant components associated with a performance problem of claim 1, further comprising:
    creating a dynamic model at runtime by determining relationships between instances of the components in the static model;
    inspecting the dynamic model for problem symptoms based on metrics associated with the components;
    identifying components exhibiting problem symptoms; and
    adding the components exhibiting problem symptoms to the dynamic problem tree.

6. The method of isolating relevant components associated with a performance problem of claim 1, wherein the link probability is a measure of co-occurrence of a problem in multiple related components.

7. A system for isolating relevant components associated with a performance problem in a middleware system, comprising:
    a computer, including a computer readable medium and processor operating thereon;
    an application server executing on the computer, wherein the application server includes a plurality of components;
    a static model of a system under test, which includes relationships between the plurality of components;
    a dynamic problem tree created by applying the static model to the system at runtime; and
    a diagnostic monitor, wherein when one or more problem symptoms are detected, the diagnostic monitor
        identifies a link probability for each relationship in the dynamic problem tree,
        traverse the dynamic problem tree to detect redundant components, wherein a component is redundant if it has a link probability with its downstream component greater than a pre-determined threshold value,
        removes redundant components from the dynamic problem tree, and
        returns a set of components which are potential components to be analyzed further to determine the root causes of the performance problem.

8. The system for isolating relevant components associated with a performance problem of claim 7, wherein the threshold value is 0.5.

9. The system for isolating relevant components associated with a performance problem of claim 7, wherein the static model is created at design time.

10. The system for isolating relevant components associated with a performance problem of claim 7, wherein the dynamic problem tree is created at runtime by determining which instances of the plurality of components are related.

11. The system for isolating relevant components associated with a performance problem of claim 7, wherein the diagnostic monitor is further operable to:
    create a dynamic model at runtime by determining relationships between instances of the components in the static model;
    inspect the dynamic model for problem symptoms based on metrics associated with the components;
    identify components exhibiting problem symptoms; and
    add the components exhibiting problem symptoms to the dynamic problem tree.

12. The system for isolating relevant components associated with a performance problem of claim 7, wherein the link probability is a measure of co-occurrence of a problem in multiple related components.

13. A non-transitory computer readable medium including instructions stored thereon which, when executed by a computer, cause the computer to:
    create a static model of a system under test, including determining relationships between components in a middleware system;
    create a dynamic problem tree by applying the static model to the system at runtime;
    identify a link probability for each relationship in the dynamic problem tree;
    traverse the dynamic problem tree to detect redundant components, wherein a component is redundant if it has a link probability with its downstream component greater than a threshold value;

remove redundant components from the dynamic problem tree;

return a set of components which are potential components to be analyzed further to determine the root causes of the performance problem.

14. The non-transitory computer readable medium of claim 13, wherein the threshold value is 0.5.

15. The non-transitory computer readable medium of claim 13, wherein the static model is created at design time.

16. The non-transitory computer readable medium of claim 13, wherein the dynamic problem tree is created at runtime by determining which instances of the components are related.

17. The non-transitory computer readable medium of claim 13, further comprising:

creating a dynamic model at runtime by determining relationships between instances of the components in the static model;

inspecting the dynamic model for problem symptoms based on metrics associated with the components;

identifying components exhibiting problem symptoms; and adding the components exhibiting problem symptoms to the dynamic problem tree.

18. The non-transitory computer readable medium of claim 13, wherein the link probability is a measure of co-occurrence of a problem in multiple related components.

* * * * *